(12) United States Patent
Von Mutius

(10) Patent No.: US 9,074,583 B2
(45) Date of Patent: Jul. 7, 2015

(54) METHOD FOR OPERATING A WIND ENERGY INSTALLATION

(75) Inventor: Martin Von Mutius, Ascheffel (DE)

(73) Assignee: SENVION SE, Hamburg (DE)

( * ) Notice: Subject to any disclaimer, the term of this patent is extended or adjusted under 35 U.S.C. 154(b) by 0 days.

(21) Appl. No.: 13/571,560

(22) Filed: Aug. 10, 2012

(65) Prior Publication Data

US 2012/0301295 A1     Nov. 29, 2012

Related U.S. Application Data

(63) Continuation of application No. PCT/EP2011/000292, filed on Jan. 25, 2011.

(30) Foreign Application Priority Data

Feb. 22, 2010   (DE) .......................... 10 2010 002 203

(51) Int. Cl.
*F03D 11/00*    (2006.01)
*F03D 7/02*     (2006.01)

(52) U.S. Cl.
CPC .......... *F03D 11/0025* (2013.01); *F03D 7/0224* (2013.01); *F03D 7/0296* (2013.01); *F05B 2270/334* (2013.01); *Y02E 10/723* (2013.01); *Y02E 10/722* (2013.01)

(58) Field of Classification Search
CPC . F03D 7/0024; F03D 7/0296; F03D 11/0025; F05B 2270/334

USPC ............. 416/1, 23, 24, 27, 31, 35, 38, 39, 98, 416/110, 112, 117, 155
See application file for complete search history.

(56) References Cited

U.S. PATENT DOCUMENTS

| | | | |
|---|---|---|---|
| 6,890,152 B1 * | 5/2005 | Thisted ............................ | 416/1 |
| 7,057,305 B2 * | 6/2006 | Kruger-Gotzmann et al. . | 290/55 |
| 2008/0152493 A1 * | 6/2008 | Sundermann et al. .......... | 416/41 |
| 2010/0014969 A1 * | 1/2010 | Wilson et al. ..................... | 416/1 |
| 2010/0014971 A1 * | 1/2010 | Risager et al. ................... | 416/1 |
| 2010/0189560 A1 * | 7/2010 | Haraguchi ........................ | 416/1 |
| 2011/0123330 A1 * | 5/2011 | Matesanz Gil ................... | 416/1 |
| 2011/0182732 A1 * | 7/2011 | Baba ............................... | 416/39 |

FOREIGN PATENT DOCUMENTS

| | | |
|---|---|---|
| EP | 1719910 | 11/2006 |
| EP | 2469080 | 6/2012 |
| JP | 2001253394 | 9/2001 |
| WO | 2009/043352 | 4/2009 |
| WO | WO 2009043352 A2 * | 4/2009 ............ F03D 7/02 |

OTHER PUBLICATIONS

International Search Report dated Apr. 27, 2011 filed in PCT/EP2011/000292.

\* cited by examiner

*Primary Examiner* — Dwayne J White
*Assistant Examiner* — William Grigos
(74) *Attorney, Agent, or Firm* — Rankin, Hill & Clark LLP

(57) ABSTRACT

A method for operating a wind energy installation (10) with a rotor (12) and at least one rotor blade (14), which can be adjusted in terms of its angle of attack. The rotor blade (14) is accelerated by virtue of at least five repeated adjustment operations of the angle of attack about its longitudinal axis (15), wherein a rotor blade bending vibration with a vibration amplitude and a vibration frequency is excited.

18 Claims, 4 Drawing Sheets

METHOD FOR OPERATING A WIND ENERGY INSTALLATION

This application is a continuation of International Application PCT/EP2011/000292, having an international filing date of Jan. 25, 2011, which is currently pending and designates the United States, and claims priority to German Patent Application 102010002203.9 filed on Feb. 22, 2010.

BACKGROUND OF THE INVENTION

The invention relates to a method for operating a wind energy installation with a rotor and at least one rotor blade, which can be adjusted in terms of its angle of attack. The invention also relates to a wind energy installation with a rotor and at least one rotor blade, which can be adjusted in terms of its angle of attack, and an operating control device. Furthermore, the invention relates to the use of a method according to the invention in a wind energy installation according to the invention.

In addition to thermal and chemical methods, mechanical methods for de-icing the rotor blades of large wind energy installations can be used.

DESCRIPTION OF RELATED ART

A method for de-icing a rotor blade of a wind energy installation is known from patent specification U.S. Pat. No. 6,890,152 B1, wherein a surface of the rotor blade vibrates through vibration-exciting elements, in particular loudspeakers or megaphones, the frequencies of which lie in particular in the low acoustical frequency range.

A method for de-icing a rotor blade of a wind energy installation is known from international application WO 2009/043352 A2, wherein ice adhering to a rotor blade of an idle wind energy installation is shaken off by abrupt acceleration and braking of the nacelle, the rotor or the rotor blade.

BRIEF SUMMARY OF THE INVENTION

The object of the present invention is to specify an efficient method for de-icing a rotor blade of a wind energy installation and a corresponding wind energy installation.

The object is solved through a method for operating a wind energy installation with a rotor and at least one rotor blade, which can be adjusted in terms of its angle of attack, which is further characterized in that the rotor blade is accelerated by virtue of at least five repeated, in particular periodic, adjustment operations of the angle of attack about its longitudinal axis, wherein a rotor-blade bending vibration with a vibration amplitude and a vibration frequency is excited. For the de-icing, complicated auxiliary systems and high and/or uncontrolled structural auxiliary loads are hereby also avoided like the need for a complete standstill of the wind energy installation before and/or after the de-icing.

The invention is based in particular on the idea of elastically deforming its surface through vibrations of the rotor blade excited in a targeted manner, whereby adhering ice is broken and/or loosened and falls off. Vibrations with a high amplitude thereby cause strong deformations, which in turn positively affects the efficiency of the de-icing. In particular, a pivoting or chordwise vibration is hereby generated, whereby in particular sufficiently large deformations are achieved on the blade nose, which lead to the loosening of the ice. A pivoting vibration is a rotor-blade bending vibration that lies in the rotor plane, in case the rotor blade is in an operating position of a partial load operation or fine pitch operation of the wind energy installation. The first bending resonance frequency of a rotor blade is normally in the flapwise direction. The pivoting vibration is mainly orthogonal to the flapwise direction. The pivoting vibration is, thus in particular, a vibration from the trailing edge of the rotor blade to the nose of the rotor blade.

The rotor blades of modern wind energy installations can be adjusted in terms of their angle of attack. For this, an adjustment device is provided for each rotor blade for rotation on the longitudinal axis. With each change in the adjustment rate, in particular when starting or stopping the adjustment device, acceleration forces act on the rotor blade, whereby it is forced to vibrate due to its mass inertia. According to the invention, the rotor blade is accelerated about its longitudinal axis in that acceleration forces are repeatedly exerted on the rotor blade by at least five consecutive, in particular periodic, adjustment operations. Within the framework of the invention, angle of attack means in particular an angular position of the rotor blade about its longitudinal axis. The adjustment around the blade longitudinal axis can thereby take place both by means of hydraulic as well as electrical adjustment systems, well known according to the state of art.

The resulting complex movement of the surface of the rotor blade can be considered a superimposition of different vibrations.

Through the complex blade geometry, in particular the curve and twist of the blade axis, flapwise vibration, pivoting vibration and torsional vibration are coupled with each other. Preferably, the $1^{st}$ natural frequency of the pivoting vibration is excited in particular.

Adjustment operations that all occur in the same direction or in alternating opposite directions both excite a rotor-blade bending vibration, in particular pivoting vibration. Under acceleration of the blade with each adjustment process, it is understood within the framework of the invention that the acceleration forces with each adjustment operation have at least one subcomponent in the direction of the rotor blade bending movement of the vibrating rotor blade. The vibration amplitude of the rotor-blade bending vibration thereby increases with each adjustment process. According to the invention, at least five consecutive adjustment operations are executed. This ensures that a sufficiently high vibration amplitude is achieved for efficient de-icing.

The rotor-blade bending vibration is damped by friction so that the vibration amplitude continuously decreases after the last adjustment operation of a series of adjustment processes. In a preferred embodiment of the invention, at least eight consecutive adjustment operations occur so that the desired height of the vibration amplitude is not only achieved, but is also maintained for a longer period of time.

In an especially preferred embodiment of the invention, structural loads and wear are prevented or kept to a minimum in that the adjustment operations are executed with an adjustment rate of less than 8°/s, in particular less than 4°/s.

The rotor-blade bending vibration is preferably a pivoting vibration, in particular a pivoting vibration with a frequency that corresponds with the first natural pivoting vibration frequency.

In a preferred embodiment of the invention, the adjustment operations take place in succession temporally such that a time between two consecutive adjustment operations in the same direction does not deviate more than +10% or −10% from the inverse first pivoting natural frequency of the rotor blade. The time is thus in particular between 90% and 110% of the inverse first pivoting natural frequency.

In another preferred embodiment of the invention, the adjustment operations take place in succession temporally such that a time between two consecutive adjustment operations in the same direction corresponds with a multiple or mainly a multiple of the inverse vibration frequency or is longer or shorter by less than 10% and/or that a time between two consecutive adjustment operations in the opposite direction preferably corresponds with an integral (integer) multiple or mainly an integral multiple of the half of the inverse vibration frequency or is longer or shorter by less than 10%. These two measures can also be combined.

Also in the case of optimally coordinated adjustment operations, the achievable vibration amplitude is not unlimitedly high, but is rather restricted by a damping-related maximum, which depends, among other things, on the vibration frequency. A particularly high maximum for the vibration amplitude is achieved when the vibration frequency is a value close to a resonance frequency of the rotor blade. Particularly advantageous is an embodiment of the invention in which the first or lowest resonance frequency of the pivoting vibration is excited in a targeted manner so that a maximum of the vibration amplitude is thus efficiently achieved. The vibration frequency is preferably less than 1.8 Hz.

A rotor blade with adhering ice has a different mass distribution than a non-iced rotor blade of the same construction. The resonance frequencies of the rotor blade are thereby shifted with respect to the non-iced state. Moreover, the resonance frequencies are constantly changed during the de-icing through ice dropping. In a particularly advantageous embodiment of the invention, the adjustment operations are executed, controlled and/or regulated and in particular thereby synchronized temporally using a sensor system. The inclusion of a sensor system in which the movement of the vibrating rotor blade is captured, measured and/or monitored through the monitoring of suitable measurement variables is thereby particularly advantageous. The adjustment operations are preferably adjusted for the changing resonance frequency, in particular the first pivoting natural frequency.

In a preferred embodiment of the invention, the sensor system captures, measures and/or monitors an electrical current, which is used to operate the adjustment device of the rotor blade angle of attack or respectively angle of attack. It is hereby taken into consideration that the power consumption of the adjustment device during an adjustment operation against the vibration movement of the rotor blade is higher than in an adjustment operation with the vibration movement of the rotor blade. The progression of an electrical current, which serves to operate the adjustment device, thus follows the vibration movement of the rotor blade, and thus in particular the pivoting vibration. The current is hereby preferably used to control the adjustment operations. Advantageously, often already existing sensors are used to control the adjustment device.

In a preferred embodiment of the invention, the sensor system measures and/or monitors at least one load, strain and/or acceleration value on the wind energy installation, in particular on the rotor blade. The vibration frequency and the vibration amplitude of the rotor-blade bending vibration, in particular pivoting vibration, can hereby be determined directly. For example, this is possible through measurement of the load of the rotor blade mounting on the hub, the strain or elongation of the rotor blade surface or the acceleration of the rotor blade.

An embodiment of the invention in which a rotor rotation with a rotor rotation frequency below one fifth, in particular below one tenth, in particular below one fifteenth, of the vibration frequency of the rotor-blade bending vibration, in particular pivoting vibration, is also particularly preferred, wherein the rotor blade specifies a revolution with an upper and a lower semicircle and executes one upwards movement and one downwards movement per revolution. It is thereby ensured that the at least five adjustment operations take place within one rotor revolution.

Particularly advantageous is another embodiment of the invention, in which the rotor rotation frequency lies in the lower frequency range for a network-coupled operation of the wind energy installation. This eliminates the long transition phases for braking or starting up the wind energy installation so that power can be produced directly before and after the de-icing process or the power production can even be continued during the de-icing process.

The rotor-blade bending vibration or respectively in particular pivoting vibration of the rotor blade is more strongly damped when the rotor is turning because an aerodynamic component of the vibration damping is added. It is still advantageous to dampen the vibration amplitude of the rotor-blade bending vibration, in particular pivoting vibration, if necessary additionally in order to avoid high or uncontrollable loads of the wind energy installation.

The vibration amplitude is preferably decreased at least in one section of the revolution of the rotor blade by one or more vibration-damping adjustment operations. An additional damping is achieved through adjustment operations of the rotor blade angle of attack, which are directed in a targeted manner at the current vibration movement of the rotor blade on the blade hub. Adjustment rate, duration and number of such adjustment operations are thereby determined by the desired degree of damping.

The adjustment operations are preferably synchronized with the rotor rotation. It is particularly advantageous if vibration-exciting adjustment operations are only executed during the downwards movement or in the lower semicircle of the revolution of the rotor blade and/or vibration-damping adjustment operations are only executed during the upwards movement and/or in the upper semicircle of the revolution of the rotor blade. It is thereby achieved that a nominal vibration amplitude of the rotor-blade bending vibration, in particular pivoting vibration, only exists in the bottom semicircle of the rotor blade revolution. This prevents ice from loosening in the upper semicircle of the revolution and hitting and/or damaging the wind energy installation.

In a particularly advantageous embodiment of the invention, the vibration-exciting adjustment operations only take place in the lower semicircle of the rotor blade revolution. If applicable, it is also advantageous to execute first adjustment operations already in the downwards movement of the rotor blade before reaching the lower semicircle of the rotor blade revolution in order to achieve a vibration amplitude of the desired height at the beginning of the lower semi-revolution.

Especially preferred is an embodiment of the invention in which the vibration amplitude is damped in a targeted manner in the upper semicircle of the revolution so that no ice is loosened in the upper semicircle of the revolution so that lower-lying parts of the wind energy installation are not damaged. If applicable, it is advantageous to begin the targeted damping already in the upwards movement of the rotor blade before reaching the upper semicircle of the revolution.

It is also advantageous to use an additional de-icing process, for example a thermal or a chemical de-icing process. The combination with the method according to the invention enables the use in particular of a thermal de-icing system with less power and thus lower costs.

The object is also solved through a wind energy installation with a rotor, at least one adjustable rotor blade and an operating control device, wherein the operating control device is designed for the use of a method according to the invention.

The object is also solved through the use of a method according to the invention for operating a wind energy installation according to the invention.

BRIEF DESCRIPTION OF THE DRAWINGS

The invention is described below, without restricting the general idea of the invention, based on exemplary embodiments in reference to the drawings, whereby we expressly refer to the drawings with regard to the disclosure of all details according to the invention that are not explained in greater detail in the text. It shows the following.

DETAILED DESCRIPTION OF THE INVENTION

In the following figures, the same or similar elements or respectively corresponding parts are provided with the same reference numbers in order to prevent the item from needing to be reintroduced.

Figure 1:
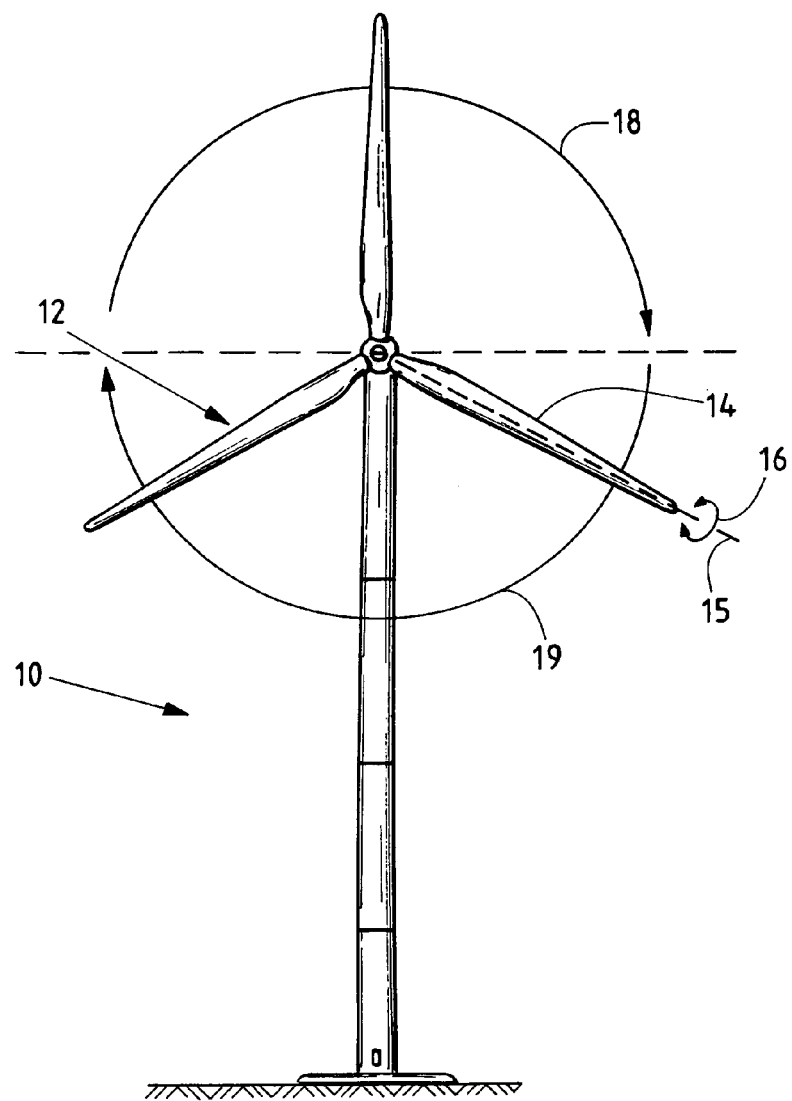
FIG. 1 a schematic representation of a wind energy installation with a rotor and an adjustable rotor blade, which describes a revolution with an upper and a lower half, FIG. 2 a schematic block diagram for an exemplary embodiment of a wind energy installation according to the invention, FIG. 3 schematic diagrams for visualization of the invention using an exemplary embodiment, FIG. 4 schematic diagrams for visualization of the invention using another exemplary embodiment.

FIG. 1 shows schematically an exemplary wind energy installation 10 with a rotor 12 and a rotor blade 14 as well as two other rotor blades, wherein for example the rotor blade 14 can be adjusted around its longitudinal axis 15 along the adjustment direction 16. When rotor 12 is turning, the rotor blade 14 specifies a revolution with an upper half 18 and a lower half 19.

Figure 2:
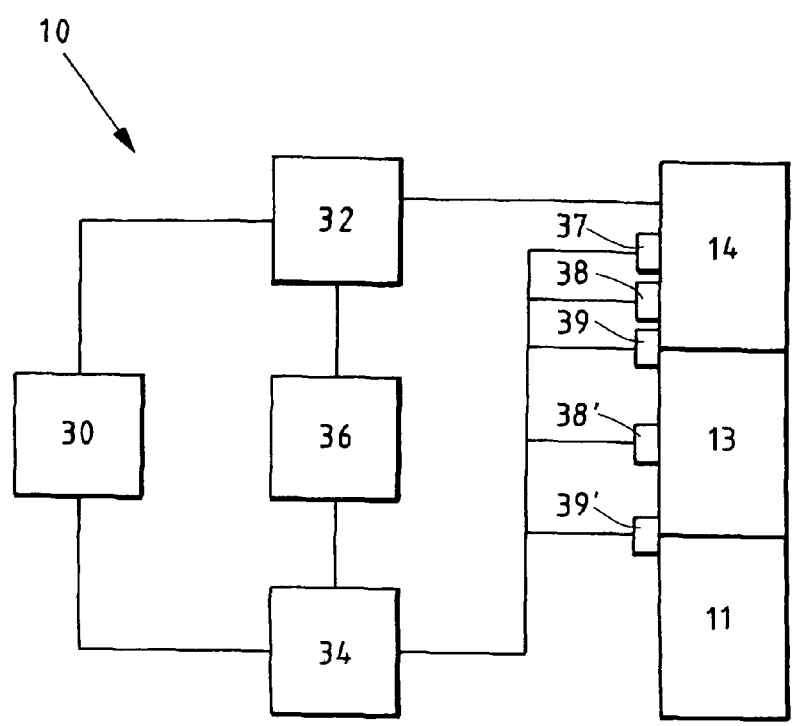

FIG. 2 shows a schematic block diagram of a wind energy installation 10 according to the invention. A rotor blade 14 of a rotor is connected schematically with a rotor hub 13 and a drive train 11. The rotor blade 14 is adjusted about its longitudinal axis 15 in the adjustment direction 16 by means of the adjustment device 32. The adjustment device 32 is operated with an electrical current 36 and controlled by an operating control device 30. The operating control device 30 thereby uses a sensor system 34, which monitors the electrical current 36. Furthermore, the sensor system monitors a strain value 37 on the rotor blade 14, an acceleration value 38 on the rotor blade 14, a load value 39 on the connection of the rotor blade 14 with the rotor hub 13, an acceleration value 38' on the rotor hub 13 and a load value 39' on the connection between the rotor hub 13 and the drive train 11.

The strain, acceleration and load values 37, 38, 38', 39 and 39' shown in FIG. 2 as well as the electrical current 36 only serve as examples for potential values measured, captured and/or monitored by the sensor system 34. Not all of these values need to be measured, captured and/or monitored. Other values can also be measured, captured and/or monitored.

Figure 3:
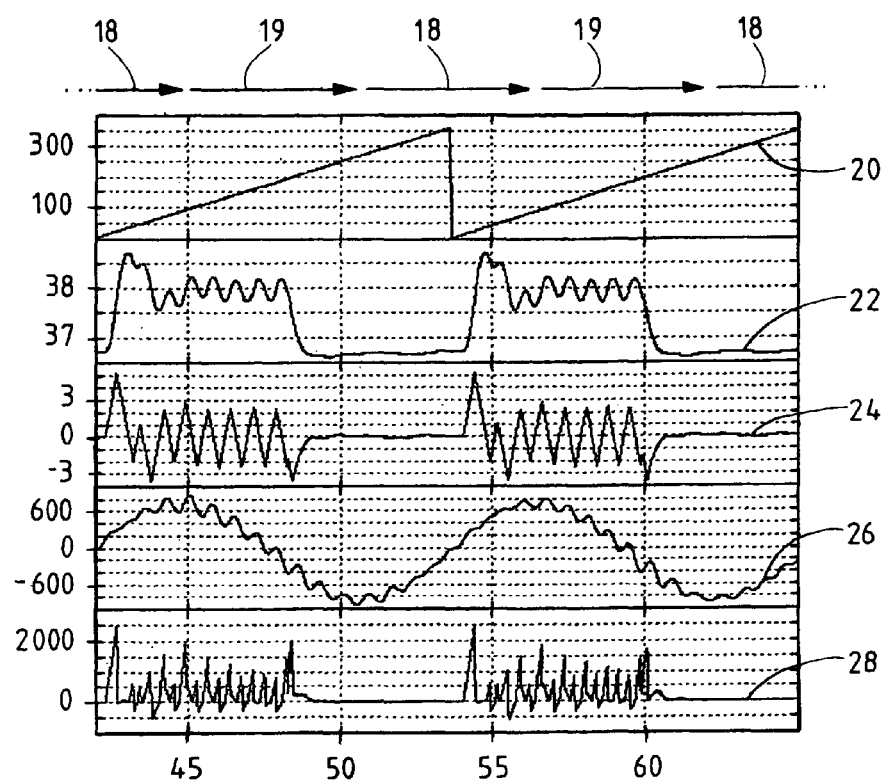

FIG. 3 shows some schematic diagrams for an exemplary embodiment of the invention. The five diagrams shown in FIG. 3 show the following from top to bottom:

1. the temporal progression 20 of the rotor blade position in °, wherein 0° corresponds with a position vertically upwards,
2. the temporal progression 22 of the angle of attack in °,
3. the temporal progression 24 of the adjustment rate in °/sec,
4. the temporal progression 26 of the bending moment on the blade root in kNm and
5. the temporal progression 28 of the power consumption of the adjustment device 32.

In this example, a rotation of the rotor 12 with approximately 0.08 Hz is present. The rotor blade 14 thereby specifies a revolution so that the position of the rotor blade 14 follows the temporal progression 20. The rotor blade 14 is thereby located alternately in the upper half 18 or the lower half 19 of the revolution, as shown by the arrows above the diagrams.

Beginning with the upwards movement of the rotor blade 14, i.e. in the middle of the upper half 18 of the revolution, the adjustment device 32 is activated, whereby the rotor blade 14 is accelerated around its longitudinal axis 15 along the adjustment device 16. The temporal progression 24 of the adjustment rate is also shown. A rotor-blade bending vibration, in particular pivoting or chordwise vibration, of the rotor blade 14 is excited by the adjustment operations. The pivoting vibration is examined in greater detail below.

Eight adjustment operations with positive and negative adjustment rates take place respectively, whereby the angle of attack, the temporal progression 22 of which is shown, is varied periodically. No adjustment operations take place during the upwards movement of the rotor blade 14, i.e. from the middle of the lower half 19 of the revolution until the middle of the upper half 18 of the revolution is reached.

Moreover, the temporal progression 26 of the bending moment on the blade root, i.e. on the connection between rotor blade 14 and rotor 12, is shown. Two overlapping components can be seen. The first goes back to the load of the rotor blade 14 under its net weight and is correlated with the temporal progression 20 of the position of the rotor blade 14. The second goes back to the pivoting vibration of the rotor blade 14 and oscillates with a corresponding vibration frequency.

It is clear that, in the case shown, the pivoting vibration causes considerably lower bending moments than the net weight of the rotor blade 14 in the area of the blade root. Should existing ice be loosened in the area of the blade root, the vibration amplitude may need to be increased. In the particularly interesting outer blade area, the additional load by the pivoting vibration is considerably greater so that ice is loosened there.

A comparison between the temporal progression 24 of the adjustment rate and the temporal progression 26 of the bending moment shows that, in this example, the adjustment operations take place periodically with a frequency that mainly corresponds with the vibration frequency of the bending moment.

Moreover, it can be seen that the component of the bending moment, which is attributed to the pivoting movement, is only present during the lower revolution 19 and not in the upper revolution 18 because no adjustment operations take place as of the middle of the lower half 19 of the revolution and the pivoting vibration fades up to the reaching of the upper half 18 of the revolution. The excitation of the pivoting vibration of the rotor blade is particularly efficient because the blade nose, which tends to ice over to a considerable degree, experiences the greatest additional load and thus also the greatest additional expansion. Since ice does not expand very much, it can be very effectively loosened from the blade surface.

The temporal progression 28 of the power consumption by the adjustment device 32 is shown as the last diagram. A correlation with the pivoting vibration of the rotor blade 14 can be seen from the comparison with the temporal progression 26 of the bending moment.

Figure 4:
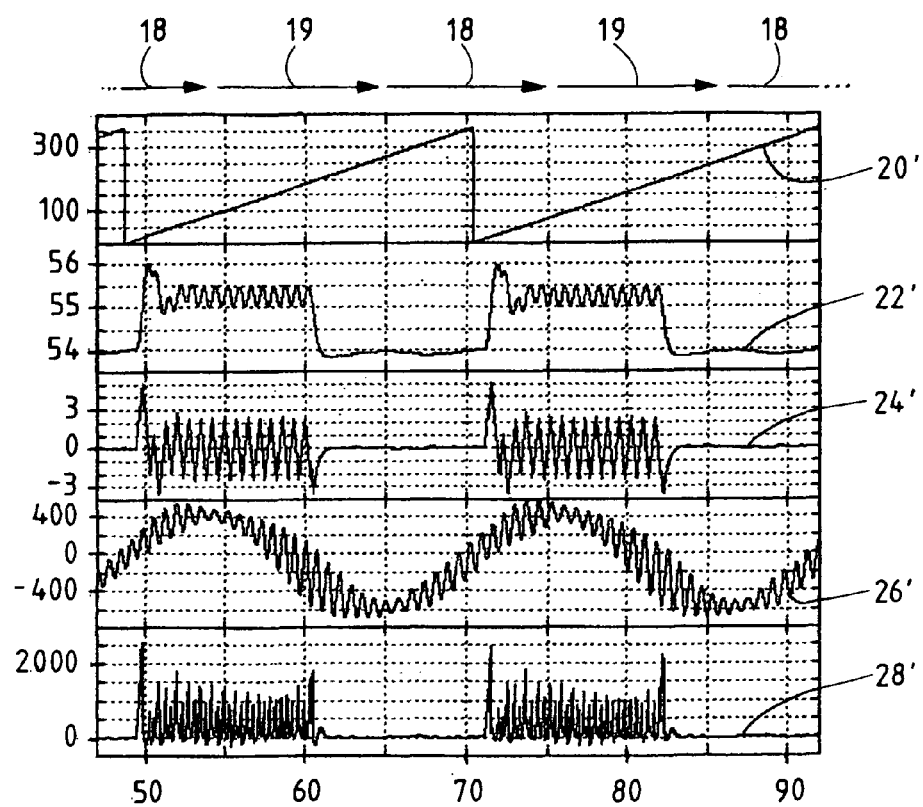

FIG. 4 shows a comparable diagram of the corresponding curves for another exemplary embodiment of the invention. In this example, a slower rotor rotation with a frequency of approximately 0.04 Hz is present. Due to the slower rotation of the rotor 12, 15 adjustment operations with positive and negative adjustment rates can take place respectively during the downwards movement of the rotor blade 14, whereby the same vibration frequency of the pivoting vibration is triggered as in the previous example.

It is apparent from the temporal progression 26' that considerably higher vibration amplitudes of the pivoting vibration are reached than in the exemplary embodiment from FIG. 3. Although, as is the case there, no adjustment operations take place during the upwards movement of the rotor blade 14, a pivoting vibration with a considerable vibration amplitude is also present during the upper half 18 of the revolution of the rotor blade 14. In such a case, it is advantageous to dampen the pivoting vibration before reaching the upper half 18 of the revolution of the rotor blade 14 through adjustment operations that are directed against the movement of the vibrating rotor blade 14.

When the wind energy installation is operating, i.e. when the rotor is rotating, the icing can be identified preventatively for the de-icing, that is without a detection of the icing, or alternatively with a sensor system. A power and/or speed reduction of the wind energy installation can then take place. The operating control system or respectively the control device of the operating control system is then switched to de-icing mode, since some status codes and monitoring instances would need to be deactivated. The rotor blade or respectively the rotor blades then excite a desired rotor-blade bending vibration, in particular pivoting vibration. Optionally, the adjustment operation of the rotor blade angle of attack can then be deferred on the upper rotor half and potentially the rotor blade angle of attack can be attributed to an average value of the blade angles of attack of the other rotor blades. A detection step for a potentially successful de-icing of the blade can flow as another optional step. Corresponding de-icing process steps for the other rotor blades follow this successively. The wind energy installation then returns back to normal operating mode.

The step of switching the operating control system to de-icing mode preferably includes a selective switching of an individual blade angle of attack drive to a de-icing mode in order to deactivate certain security questions, for example with respect to the permissible rotor blade angle of attack accelerations. This preferably occurs in a fail-safe manner via the slip ring for the hub and namely respectively only for one blade axis.

An alternative embodiment for de-icing occurs at a standstill, for example when there is an ice-caused imbalance of the rotor. The icing is first identified through suitable measures, for example through a considerable rotor imbalance during startup. The rotor blades are then set to flag position in order to slow down the rotor. The rotor is then locked up by means of a rotor brake in a specifiable position resulting from the imbalance.

The operating control system is then switched to de-icing mode in order to deactivate status codes and monitoring instances of normal mode. According to the invention, a rotor-blade bending vibration or respectively pivoting vibration of the lowest lying blade is then repeatedly performed. Optionally, a detection of the successful de-icing of this blade can then be performed. The rotor brake is then released. A passive or respectively blade-adjustment-supported levelling off of the rotor and a new position of another rotor blade resulting from the imbalance can then be set. The previous steps from the locking of the rotor with a rotor brake to the release of the rotor brake and in between the repeated excitation, that is the execution of the de-icing process according to the invention, can then be repeated for the other blades, and namely until the imbalance is fixed or no further improvement can be identified. The wind energy installation is then transferred to normal operating mode.

The imbalance is identified, for example, through evaluation of the rotational speed signal during startup of the wind energy installation, for example in trundle mode or by means of acceleration sensors in the tower head. The occurring vibration amplitude, in particular pivoting vibration amplitude, is adjustable in particular using two parameters for the given blade properties or for constant blade properties. These parameters are the severity of the excitation, that is the pitch rate and the accelerations, as well as the distance between the excitation frequency and the blade natural frequency or respectively the pivoting vibration natural frequency.

Since the natural frequency of an iced rotor blade is reduced by the additional mass, the excitation must also be reduced during icing. For this purpose, the actual blade pivoting frequency can be determined by a sensor, for example by an acceleration, strain or force sensor, and adjusted for excitation. Alternatively, the excitation frequency can be reduced gradually starting from the, in particular non-iced nominal natural frequency, in particular pivoting natural frequency of the blade.

The occurring vibration amplitudes are monitored by preferably already existing sensors such as for example electrical variables or parameters in the blade angle of attack system, for example the angle of attack current or respectively the electrical current, which is used to operate the adjustment device of the rotor blade angle of attack. The pivoting vibration is then excited multiple times with the excitation frequency with preferably maximum amplitude. If the vibration amplitudes are reduced, the excitation frequency is increased again slightly, since it is very likely that ice has now fallen off.

After successful de-icing, the excitation with nominal frequency must lead to the largest vibration amplitudes, which means that the rotor blade was successfully de-iced. In the case of excitation through adjustment of the blade angle of attack, an offset in the positive direction is specified in order to prevent negative settings of the blade angle from leading to an airflow disruption and thus to a stall effect.

Whenever the term "natural frequency" is used within the framework of this application, it also includes the term "resonance frequency" and vice versa.

All named characteristics, including those taken from the drawings alone, and individual characteristics, which are disclosed in combination with other characteristics, are considered alone and in combination as important to the invention. Embodiments according to the invention can be fulfilled through individual features or a combination of several features.

LIST OF REFERENCES

10 Wind energy installation
11 Drive train
12 Rotor
13 Rotor hub
14 Rotor blade
15 Longitudinal axis
16 Adjustment direction
18 Revolution (upper half)
19 Revolution (lower half)
20, 20' Temporal progression (rotor blade position)

22, 22' Temporal progression (angle of attack)
24, 24' Temporal progression (adjustment rate)
26, 26' Temporal progression (bending moment)
28, 28' Temporal progression (power consumption)
30 Operating control device
32 Adjustment device
34 Sensor system
36 Electrical current
37 Strain value
38, 38' Acceleration value
39, 39' Load value

The invention claimed is:

1. A method for operating a wind energy installation (10) with a rotor (12) and at least one rotor blade (14), which can be adjusted in terms of its angle of attack, comprising the steps of:
   accelerating the rotor blade (14) by virtue of at least five repeated adjustment operations of the angle of attack about its longitudinal axis (15),
   wherein a rotor-blade bending vibration with a vibration amplitude and a vibration frequency is excited,
   wherein the vibration amplitude of the rotor-blade bending vibration increases with each of the adjustment operations,
   wherein the rotor-blade bending vibration is a pivoting vibration,
   wherein the adjustment operations take place in succession temporally such that a time between two consecutive adjustment operations in a same direction does not deviate more than +10% or −10% from an inverse first pivoting natural frequency of the rotor blade,
   wherein a rotor rotation with a rotor rotation frequency below one fifth of the vibration frequency is present, and
   wherein the rotor blade (14) specifies a revolution with an upper (18) and a lower semicircle (19) and executes an upwards movement and a downwards movement per revolution.

2. The method according to claim 1, wherein at least eight repeated adjustment operations take place.

3. The method according to claim 1, wherein the adjustment operations are executed with an adjustment rate of less than 8°/s.

4. The method according to claim 1, wherein the vibration frequency is less than 1.8 Hz.

5. The method according to claim 1, wherein the adjustment operations are executed, controlled and/or regulated.

6. The method according to claim 5, wherein a sensor system captures, measures and/or monitors an electrical current (36) that is used to operate an adjustment device (32) of the rotor blade angle of attack.

7. The method according to claim 5, wherein a sensor system (34) captures, measures and/or monitors at least one load, strain and/or acceleration value (37, 38, 38', 39, 39').

8. The method according to claim 1, wherein the rotor rotation frequency lies in the lower frequency range for a network-coupled operation of the wind energy installation (10).

9. The method according to claim 1, wherein the vibration amplitude is reduced at least in one section of the revolution of the rotor blade (14) through one or more vibration-damping adjustment operations.

10. The method according to claim 1, wherein the adjustment operations are synchronized with the rotor rotation, wherein in particular vibration-exciting adjustment operations are only executed during the downwards movement or in the lower semicircle (19) of the revolution of the rotor blade (14) and/or vibration-damping adjustment operations are only executed during the upwards movement and/or in the upper semicircle (18) of the revolution of the rotor blade (14).

11. The method according to claim 1, wherein an additional de-icing process is used.

12. A wind energy installation (10) with a rotor (12) and at least one adjustable rotor blade (14) and an operating control device (30), wherein the operating control device (30) is designed for the use of a method according to claim 1 for de-icing the at least one adjustable rotor blade (14).

13. The method according to claim 3, wherein the adjustment rate is less than 4°/s.

14. The method according to claim 1, wherein the pivoting vibration is a pivoting vibration with a frequency that corresponds with the first natural pivoting vibration frequency.

15. The method according to claim 5, wherein the adjustment operations are synchronized temporally, using a sensor system (34).

16. The method according to claim 1, wherein the rotor rotation frequency is below one tenth of the vibration frequency.

17. The method according to claim 1, wherein the rotor rotation frequency is below one fifteenth of the vibration frequency.

18. The method according to claim 11, wherein the additional de-icing process is a thermal de-icing process.

* * * * *